A. WORK.
Electric Hose-Coupling.
No. 202,392.        Patented April 16, 1878.
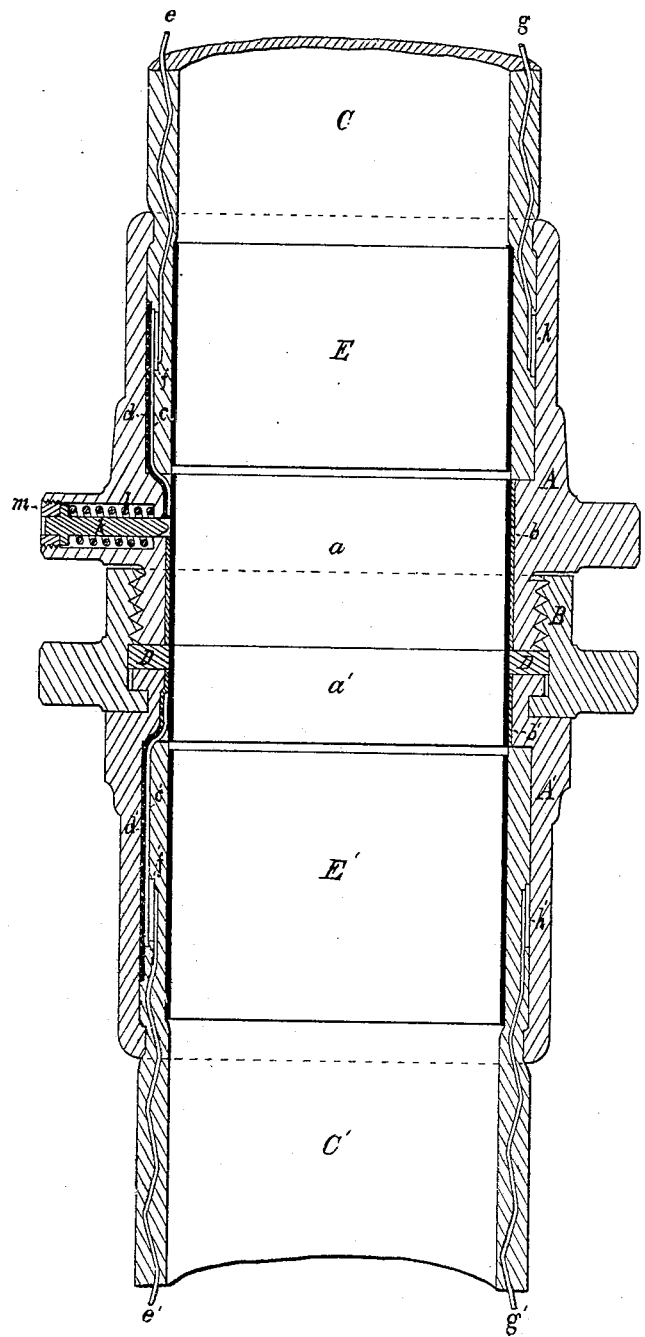
WITNESSES.                                  INVENTOR.

UNITED STATES PATENT OFFICE.

ALANSON WORK, OF PROVIDENCE, RHODE ISLAND, ASSIGNOR TO BENJAMIN F. GOODRICH, OF AKRON, OHIO.

IMPROVEMENT IN ELECTRIC HOSE-COUPLINGS.

Specification forming part of Letters Patent No. 202,392, dated April 16, 1878; application filed March 22, 1878.

*To all whom it may concern:*

Be it known that I, ALANSON WORK, of the city and county of Providence, and State of Rhode Island, have invented a new and useful Improvement in Couplings for Telegraph-Hose; and I do hereby declare that the following is a full, clear, and exact description of the construction and operation of the same, reference being had to the annexed drawings, making a part of this specification, and to the letters and figures of reference marked thereon.

My invention consists in a novel construction of a hose-coupling, whereby a union may be made between two lengths of hose by means of male and female screw-threads in the ordinary manner, and simultaneously therewith an electric connection is automatically effected between two separate lines of wire running through each of the two lengths of hose, so that each line shall be entirely insulated from the other. Such hose is used for establishing a means of communication between the engineer of a fire-engine and the pipeman at the other end of the line, or at any intermediate coupling.

An electro-magnetic signal-bell of the ordinary form and a voltaic battery or a magneto-electric machine are stationed at the engine, and are so connected with the line-wires in the hose that by bringing the two lines in contact at any point the circuit will be closed and the alarm-bell struck.

In Letters Patent granted February 6, 1872, to Wm. H. Mumler a device for a similar purpose is shown; but the electric connections are entirely independent of the coupling proper, and have to be separately joined after the coupling is screwed together. Being outside of the coupling, also, they are exposed to serious injury from the rough usage to which such hose is subjected.

The object of my invention is to make the electric connections within the coupling, where they will be protected from injury, and to so arrange them that the connection will be automatic, and obviate any possibility of negligence on the part of the hoseman, the construction being also such that a perfect insulation is maintained between the two lines.

The drawing is a representation of a longitudinal cross-section, showing the coupling attached to the hose and screwed together.

The general construction of the coupling shown is similar to that described in Letters Patent granted to me March 21, 1876.

A is the band of the male coupling, and A' the band of the female. B is the female screw, swiveled upon the band A'. C and C' are the ends of the two lengths of hose to be joined. D is a gasket of rubber or leather. E and E' are rings of brass, copper, or other ductile metal, which are expanded within the hose to secure it in the band, as more particularly described in Letters Patent above referred to. $a$ is also a ring of brass or copper, secured within the outlet of the male screw, and surrounded by the rubber tube $b$, which entirely insulates it from the band A. A similar ring, $a'$, is secured within the outlet of the female coupling, insulated in like manner from the band A' by the rubber tube $b'$.

My method of securing these rings in place is as follows: I slip the rubber tube over the brass ring, and, having placed it in the proper longitudinal position, I expand it by means of the tool patented by me October 10, 1876, until the rubber is sufficiently pinched to hold the ring in place. The rubber tube is designed not only to insulate the ring from the band, but also to serve as a spring, so as to permit a moderate longitudinal movement of the rings under an end pressure, and cause them to return to their original position when the pressure is withdrawn. The diameters of the two rings are made to correspond, so that the ends will abut against each other.

$c$ and $c'$ are metallic strips or wires, one end of which is soldered to the rings $a$ and $a'$, and the other end extends within the bands A and A'. Between the strips and the bands are interposed layers of cotton duck or other suitable material, to insulate them from the bands.

$e$ and $e'$ represent copper wires or cables, which are placed between the plies of the hose at the time of its construction, being brought to the outside near each end, and secured to the metallic pads $f$ and $f'$, for the purpose of exposing a greater area. I prefer that the strips $c$ and $c'$ should also have a similar enlargement at their ends.

$g$ and $g'$ are also copper wires within the hose, upon the opposite side, and terminating with like metallic pads $h$ and $h'$, which come directly in contact with the bands A and A'. K is a pin inserted in one of the horns of the male coupling, and confined by the threaded bushing $m$, against which it is held by the spring $l$.

Directly under the pin a hole is cut through the rubber tube $b$, so that when the pin is pressed down it will come in contact with the ring $a$. The point of the pin is covered with platinum, and also the exposed portion of the ring underneath, so as to insure an electric connection when the contact is made.

The method of attaching the coupling to the hose is as follows: The band is slipped over the hose in such a position that the strip $c$ will lie against the pad $f$. The ring E is then expanded, forcing the pad and strip into close contact, and also pressing the pad $h$ against the band A.

By simply pressing upon the pin in any coupling along the line the alarm-bell is struck at the engine, conveying signals in accordance with any prearranged code.

I do not limit myself to the application of this device to the specific form of coupling shown, as it may be applied without substantial variation to couplings where the union is made by means of a clutch or other equivalent arrangement instead of a screw-thread. It may also be applied to couplings which are attached to the hose in a manner different from that shown. Nor do I confine myself to the particular method shown of closing the circuit, as various modifications of the plan of bringing the two lines in contact will readily suggest themselves.

What I claim as new, and desire to secure by Letters Patent, is—

1. In a coupling for telegraph-hose, the insulated rings $a$ and $a'$, or their equivalent, connected with wires in the hose, and so arranged and constructed that they will make an electric contact when the coupling is joined together, substantially as shown.

2. The combination of the ring $a$, the connecting-wire $c$, the elastic insulating-tube $b$, and the coupling, substantially as described.

3. In a coupling for telegraph-hose, the metallic circuit $e\ c\ a$, $a'\ c'\ e'$, and $g$ A A' $g'$, insulated the one from the other, and arranged to operate substantially as described.

4. The combination of the insulated circuit $e\ c\ a$ and the pin $k$, or an equivalent device, whereby an electric connection may be readily made and broken between the coupling and the circuit, substantially as shown.

In testimony that I claim the above I have subscribed my name in the presence of two witnesses.

ALANSON WORK.

Witnesses:
SAML. G. COLWELL,
ROBT. J. GILMORE.